United States Patent
Fukuchi et al.

(10) Patent No.: US 6,687,207 B2
(45) Date of Patent: Feb. 3, 2004

(54) OPTICAL RECORDING APPARATUS FOR RECORDING INFORMATION ON A WRITE-ONCE DISK OR AN ERASABLE OPTICAL DISK

(75) Inventors: Kiyoshi Fukuchi, Tokyo (JP); Yoshiyuki Otsuka, Akishima (JP); Mitsumasa Kubo, Tachikawa (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/883,670

(22) Filed: Jun. 18, 2001

(65) Prior Publication Data

US 2002/0001270 A1 Jan. 3, 2002

(30) Foreign Application Priority Data

Jul. 19, 2000 (JP) .................................. 2000-219594

(51) Int. Cl.[7] ................................ G11B 7/00
(52) U.S. Cl. .................. 369/53.2; 369/53.29; 369/116
(58) Field of Search ........................... 369/47.5, 47.51, 369/47.53, 47.54, 47.55, 53.2

(56) References Cited

U.S. PATENT DOCUMENTS

| | | | |
|---|---|---|---|
| 4,858,219 A | * 8/1989 | Yoshikawa | 369/116 |
| 4,908,815 A | * 3/1990 | Gregg et al. | 369/116 |
| 5,005,164 A | * 4/1991 | Sakamoto et al. | 369/116 X |
| 5,155,719 A | * 10/1992 | Masakawa | 369/47.52 |
| 5,353,270 A | * 10/1994 | Iimura | 369/116 X |
| 5,493,549 A | * 2/1996 | Miyazawa | 369/116 X |
| 5,586,099 A | * 12/1996 | Finkelstein et al. | 369/116 |
| 5,706,271 A | * 1/1998 | Hashimoto | 369/116 |
| 5,737,289 A | * 4/1998 | Udagawa | 369/116 X |
| 5,793,737 A | * 8/1998 | Den Boef | 369/116 |
| 5,898,655 A | * 4/1999 | Takahashi | 369/116 X |
| 6,067,284 A | * 5/2000 | Ikeda et al. | 369/116 X |
| 6,215,741 B1 | * 4/2001 | Ishiduka | 369/116 X |
| 6,418,102 B1 | * 7/2002 | Suga | 369/47.53 |

FOREIGN PATENT DOCUMENTS

| | | | | |
|---|---|---|---|---|
| JP | 07-235056 | * | 9/1995 | G11J/7/00 |
| JP | 11-066562 | * | 3/1999 | G11B/7/00 |
| JP | 11-250459 A | | 9/1999 | |

OTHER PUBLICATIONS

Abstract of JP 11-250459.

* cited by examiner

Primary Examiner—Aristotelis M. Psitos
(74) Attorney, Agent, or Firm—Anderson Kill & Olick; Eugene Lieberstein; Michael N. Meller

(57) ABSTRACT

An optical disk recording apparatus for recording information onto a write-once or erasable optical disk has a memory component including a table of prerecorded correction curves consisting of recording power correction values corresponding to radial positions for each type of a variety of different optical disks, a correction component for correcting the recording power in an optimum power control operation (OPC) operation using the appropriate correction value, and a recording component for recording information onto the optical disk using the corrected recording power.

2 Claims, 5 Drawing Sheets

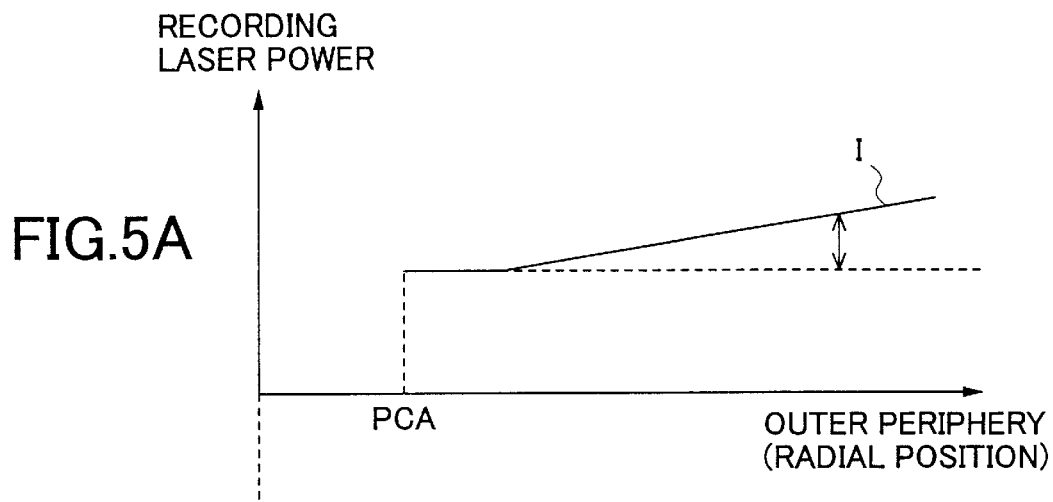
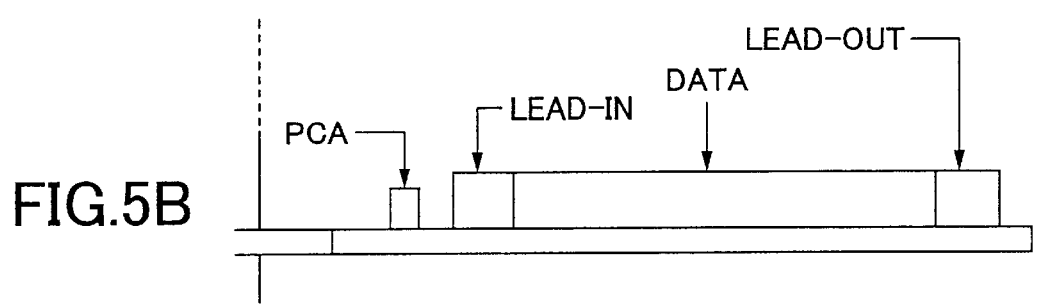
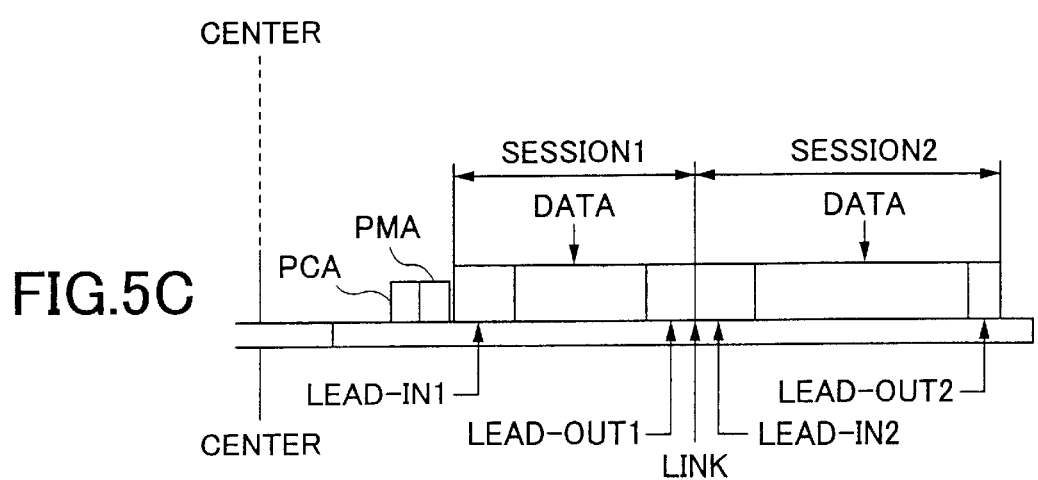

OPTICAL RECORDING APPARATUS FOR RECORDING INFORMATION ON A WRITE-ONCE DISK OR AN ERASABLE OPTICAL DISK

BACKGROUND OF THE INVENTION

1. Field of the Invention

The present invention relates generally to an optical disk recording apparatus, and more particularly, to an improved optical disk recording apparatus for recording information on a write-once optical disk or an erasable optical disk.

2. Description of the Related Art

Conventionally, recordable optical disks break down into two general types: write-once and erasable/rewritable (hereinafter referred to as erasable). Further, there are two methods for recording information onto a write-once optical disk: using Te and Bi as the material for the signal recording surface and projecting a laser beam onto the surface of the disk to melt the surface to form pits thereon, and using $Sb_2$, $Se_3$ TeOx and a thin film of organic dye for the material for the signal recording surface, projecting a laser beam onto the surface of the disk and altering the reflection factor.

CD-R disks, which are write-once disks, are provided with guides called pregrooves. The pregroove wobbles slightly in a radial direction of the disk around a central frequency of 22.05 kHz, with recording time address information called ATIP (Absolute Time In Pregroove) recorded with FSK modulation at a maximum deviation of ±1 kHz.

With such CD-R disks, a recording power calibration process known as Optimum Power Control (OPC) is carried out in order to set the laser beam at an optimum recording power.

In order to facilitate an understanding of the present invention, a description will first be given of the OPC process in a conventional write-once optical disk recording apparatus.

FIG. 1 is a diagram illustrating an optical disk warp. As shown in FIG. 1, the recording surface of the optical disk includes a data area for recording a variety of data and a Power Calibration Area (indicated in the drawing as PCA) for test recordings in order to set the laser beam to optimum recording power.

The PCA is provided at the innermost track of the disk, and is in turn composed of a test area and a count area. The test area in turn is composed of 100 partitions, with each partition composed of 15 frames. In a single OPC operation a single partition is used, with test signals at 15 different levels of laser power being recorded, one signal (that is, one level) in each of the 15 frames. Thereafter peak (P) and bottom (B) values of an RF (high frequency) signal envelope generated from the test area are detected. Finally, that recording power level at which it is determined that a value beta (where beta=(P+B)/(P−B)) exceeds some predetermined value (for example 0.04) is set as the optimum recording power.

The above-described setting of the optimum recording power at time of recording requires that the optimum recording power be set for each disk, because disk recording characteristics differ from one manufacturer to the next. It naturally follows that an inability to obtain the optimum recording power for each disk can lead to a sharp increase in post-recording error rate and jitter.

Furthermore, optical disk specification sheets observe that running OPC is conducted during information recording. Running OPC is a process in which the recording power is continuously monitored and adjusted as necessary, by comparing the intensity of the light reflected back from the pits in the surface of the optical disk when the optimum recording power was set during the OPC process with the intensity of the light reflected from the pits during information recording and correcting the recording power as appropriate based on the results of the comparison.

It should be noted that a pit having a time width of 11 T is used as the pit for obtaining the intensity of the reflected light (reference time width T is a standard speed, that is, at a speed of 1 X, approximately 230 nsec for one cycle at a frequency of 4.32 MHz), with the intensity of the light reflected from the rear edge of the pit being used for calibration.

As a result, the running OPC process can continuously adjust the laser recording power even as information is recorded on the disk moving radially from the inner periphery toward the outer periphery of the disk and as the optimum recording power varies from the optimum recording power set during the OPC process due to warpage of the optical disk and unevenness in sensitivity within the surface of the disk.

However, despite the use of running OPC to correct for variations in optimum recording power, the conventional art as described above has the following disadvantage.

Namely, most of the optical disks in question are recorded on one side only, so a certain amount of warpage is inevitable. Even so, the market is flooded with relatively heavily warped disks that have been perhaps poorly manufactured in a misguided effort to cut costs. With such disks the angle at which the recording laser light strikes the PCA located nearer the inner periphery of the optical disk 10 shown in FIG. 1 differs substantially from the angle at which the recording laser light strikes the data area that is located nearer the outer periphery of the optical disk 10, such that the laser light that is actually effective for recording differs from the laser light actually emitted from the object lens of the laser unit, and hence differs sharply from the optimum recording power.

The above-described problem is not of great concern when information is record on the optical disk continuously, that is, without interruption, from inner periphery to outer periphery during a so-called disk-at-once recording operation, because in that case the running OPC process described above works to ensure that the recording power is continuously corrected as necessary. However, in a case of so-called multi-session recording, in which information is not recorded continuously, a problem arises when recording of information commences again at an outer periphery of an area of the disk that has been recorded previously, because it typically requires a number of blocks before the running OPC function recommences operation, during which interval recording is conducted without benefit of correction of the laser power to optimum recording power, with a consequent failure to obtain optimum recording and a sharp increase in error rate and jitter.

SUMMARY OF THE INVENTION

Accordingly, it is an object of the present invention to provide an improved and useful optical disk recording apparatus and method, in which the above-described drawbacks and disadvantages are eliminated.

Another, further and more specific object of the present invention is to provide an improved and useful optical disk recording apparatus and method that can reduce degradation in recording conditions arising from variations in disk intrasurface sensitivity including disk warpage when adding information to an optical disk during multi-session recording of information The above-described object of the present invention is achieved by an optical disk recording apparatus for recording information onto a write-once or erasable optical disk, the apparatus having a memory component, a correction component and a recording component. The memory component includes a table of prerecorded correction curves consisting of recording power correction values corresponding to radial positions for each type of a variety of different optical disks. The correction component continuously correcting as necessary the recording power using the appropriate correction value, in a process known as running OPC. The recording component records information onto the optical disk using the corrected recording power.

According to this aspect of the invention, degradation in recording conditions arising from variations in disk intrasurface sensitivity including disk warpage can be reduced and sharp deterioration in error rate and jitter can be eliminated so as to corrects the recording power obtained during OPC.

BRIEF DESCRIPTION OF THE DRAWINGS

These and other objects, features, aspects and advantages of the present invention will become better understood and more apparent from the following description, appended claims and accompanying drawings, in which:

FIGS. 5A, 5B and 5C illustrate a warp correction curve, disk-at-once and multi-session recording, respectively.

DETAILED DESCRIPTION OF THE INVENTION

A detailed description will now be given of an improved optical disk recording apparatus according to the present invention, with reference to the accompanying drawings. It should be noted that identical or corresponding elements are given identical or corresponding reference numbers in all drawings, with detailed descriptions thereof given once and thereafter omitted.

Figure 1:
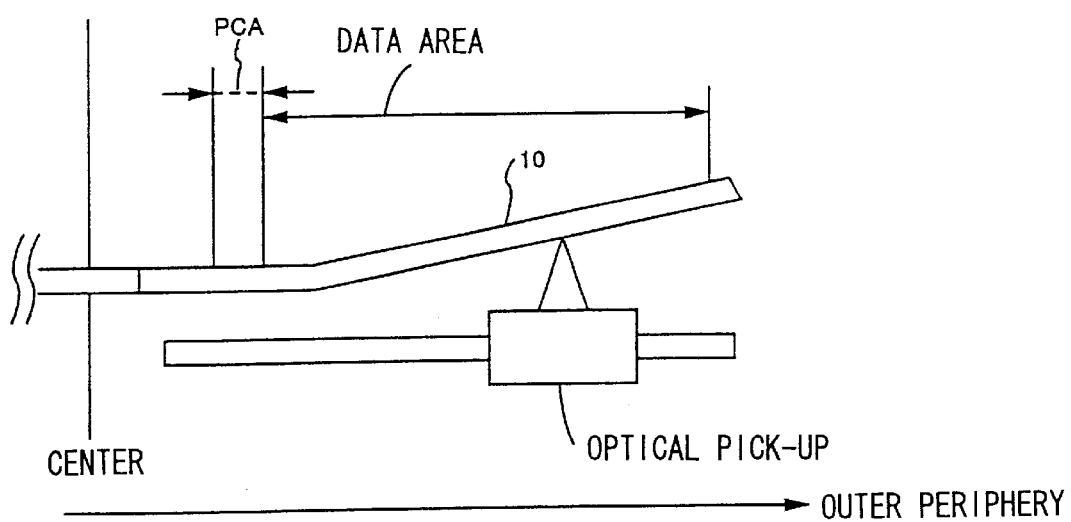
FIG. 1 is a diagram illustrating an optical disk warp.
Figure 2:
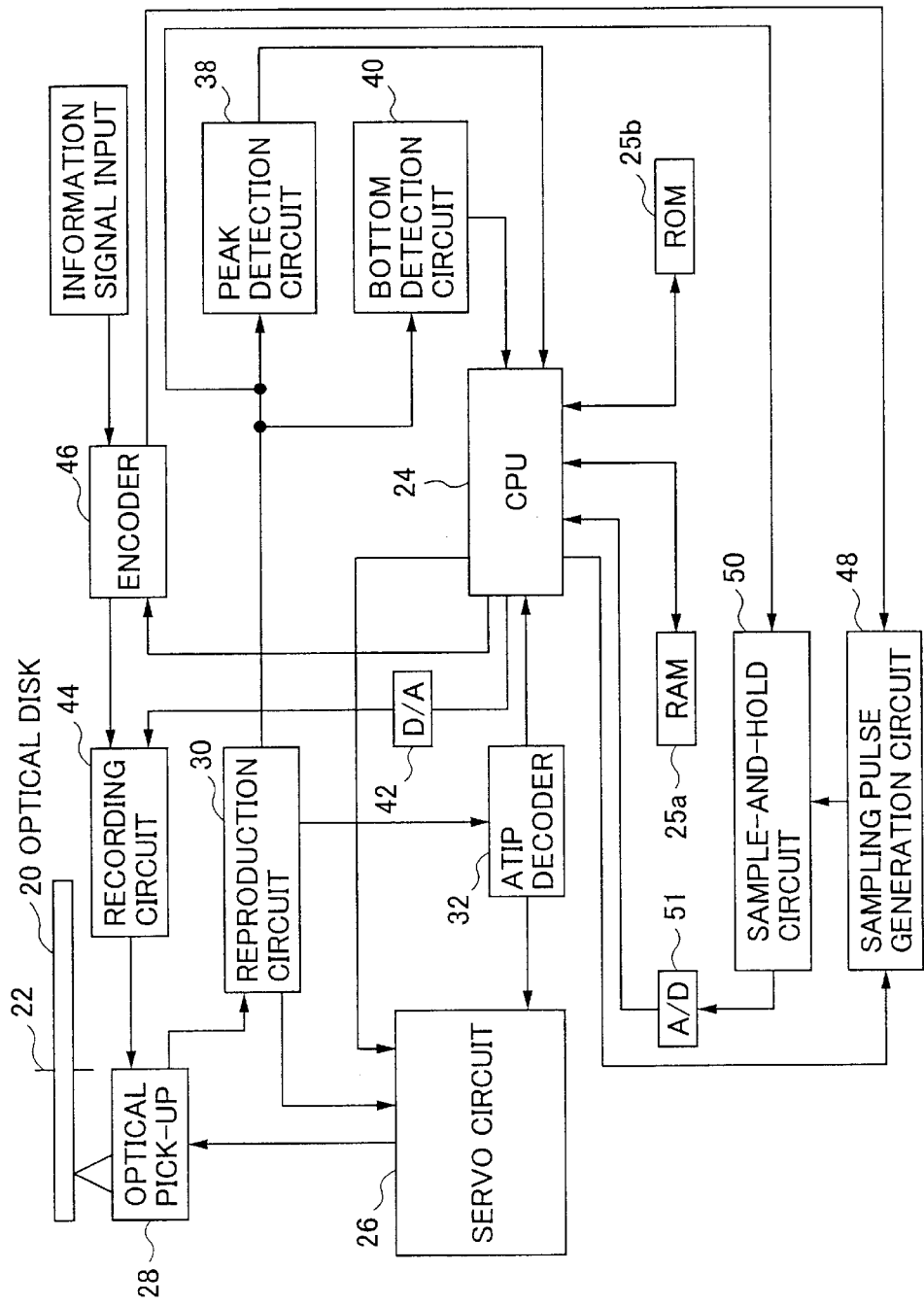
FIG. 2 is a block diagram of one embodiment of an optical disk recording apparatus according to the present invention.

FIG. 2 is a block diagram of an optical disk recording apparatus according to one embodiment of the present invention.

As can be seen from the diagram, an optical disk 20 is driven by a spindle motor so as to rotate about a shaft 22. A CPU 24 then supplies a command to a servo circuit 26 based on a read/write command issued from an upstream device.

The servo circuit 26 acts as the spindle motor CLV servo, and at the same time provides rotational control for the spindle motor of an optical pick-up 28 so as to move the optical pick-up 28 to a desired block on the optical disk 20 (tracking) as well as focusing the optical pick-up 28.

A laser beam emitted from the optical pick-up 28 is reflected from the recording surface of the optical disk 20 and the beam thus reflected is picked up by the optical pick-up 28. The reproduced RF signal obtained at the optical pick-up 28 is then supplied to a reproduction circuit 30, and the reproduced RF signal amplified at the reproduction circuit 30 is supplied to the servo circuit 26 and an ATIP signal split after being EFM demodulated inside the reproduction circuit 30 and supplied to an ATIP decoder 32. Additionally, a demodulation signal is supplied to a decoder now shown in the diagram and CIRC decoded and, after error correction, output as reproduced data. The ATIP decoder 32 decodes a variety of ATIP information such as ID number and several parameters and supplies the decoded information to the CPU 24 and to the servo circuit 26.

The reproduction signal output from the reproduction circuit 30 is supplied to a peak detection circuit 38 and a bottom detection circuit 40. The peak detection circuit 38 detects the reproduction signal envelope peak value (P) and supplies same to the CPU 24. The bottom detection circuit 40 detects the reproduction signal envelope bottom value (B) and supplies same to the CPU 24.

The CPU 24 then calculates a beta value from the peak and bottom values using the formula $(P+B)/(P-B)$. Using the beta value so obtained, the CPU 24 then generates a recording power control signal, which is then turned into pan analog signal by a D/A converter 42 and supplied as a recording power control voltage to a recording circuit 44. An encoder 46 then CIRC encodes the input recording signal based on the CPU 24 control and supplies the encoded signal to the recording circuit 44.

During recording, the recording circuit 44 then EFM modulates the signal supplied from the encoder 46, adjusts the modulated signal to a recording power that corresponds to the recording power control voltage, and supplies same to a laser diode inside the optical pick-up 28. The laser beam is then projected onto the optical disk 20 and signal recording commences.

However, OPC and running OPC involve the recording signals from the encoder 46 being supplied to a sampling pulse generator circuit 48 and a clock signal from the CPU being supplied to the sampling pulse generator circuit 48. The sampling pulse generator circuit 48 generates a sampling pulse that is supplied to a sample-and-hold circuit 50 so as to sample the reproduction signals from the trailing edges of the pits having a width of 11 T. The sample-and-hold circuit 50 samples and holds the reproduction signals supplied from the reproduction circuit 30 at the signal level so supplied. The hold level is then digitized at the A/D converter 51 and supplied to the CPU 24, where it is stored in RAM 25a. The hold level changes according to the way the recorded pits are formed, so the recording power can be adjusted by pre-storing the hold level at optimum recording power during OPC, comparing that level with the hold level during actual data recording, and adjusting the recording power based on the results of that comparison.

It should be noted that a record of previous OPCs (that is, recording power calibrations) are stored for a certain period of time in the RAM 25a that is connected to the CPU 24.

Further, a table containing optical disk type (ID number), start power and step power keyed to optical disk type, and warp correction curves for each type of optical disk is stored in a ROM 25B including an EEPROM connected to the CPU 24.

Figure 3:
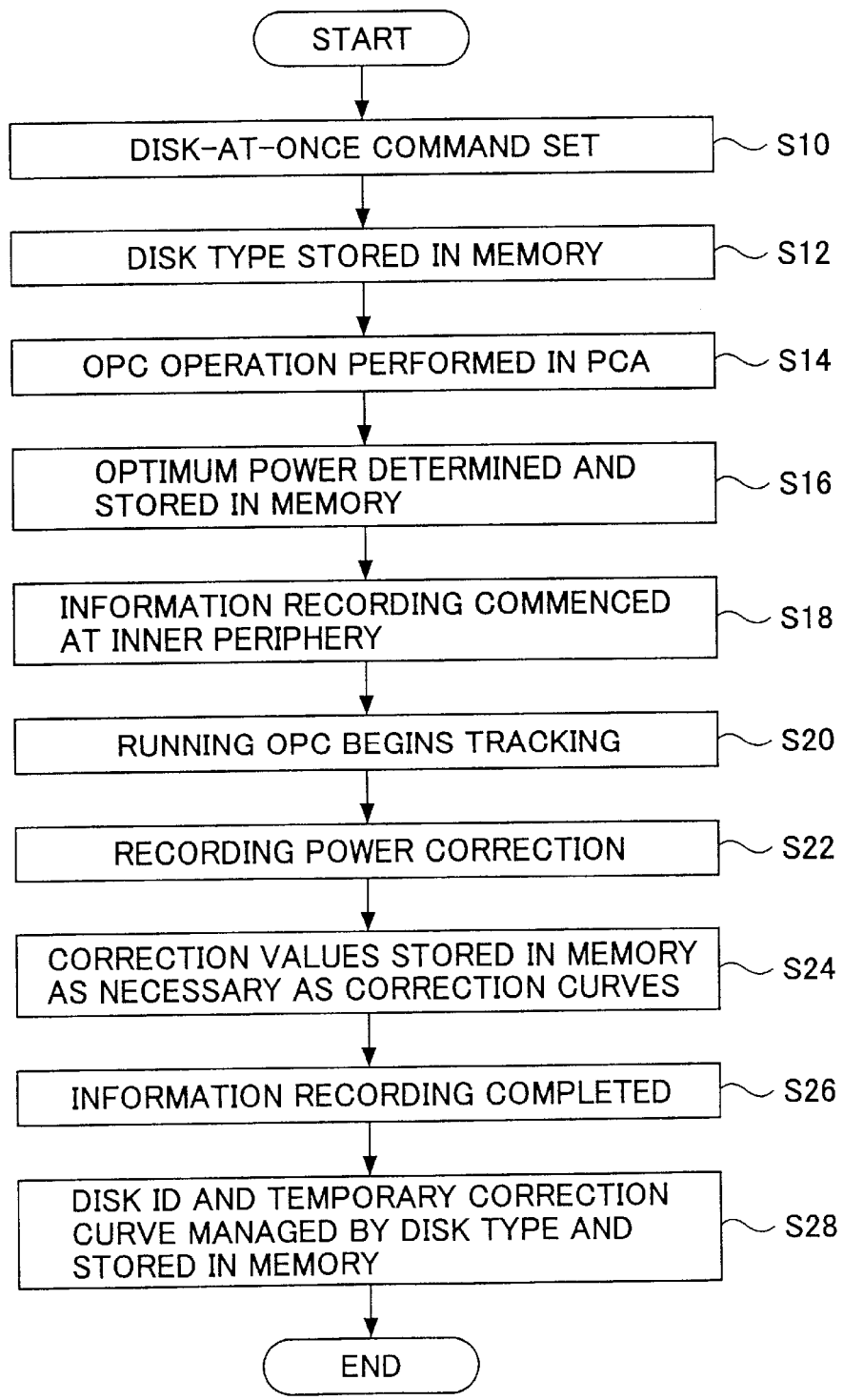
FIG. 3 is a flow chart of steps in an optimum recording power variation registration process executed by an optical disk recording apparatus according to one embodiment of the present invention.

FIG. 3 is a flow chart of steps in an optimum recording power variation registration process executed by an optical disk recording apparatus according to one embodiment of the present invention. This process is executed for each type of optical disk when manufacturing an optical disk recording apparatus.

First, in a step S10 a disk-at-once recording command is set to the optical disk recording apparatus, and in a step S12, the type of optical disk (that is, the disk ID) read from the optical disk loaded in the optical disk recording apparatus is stored in a work area of the RAM 25a. Next, in a step S14 an OPC operation is carried out in the PCA which is the optical disk test recording area. In a step S16 an optimum recording power is determined with reference to the OPC operation of the preceding step and stored in the work area of the RAM 25a.

Next, in a step S18 the recording of test data onto the optical disk in successive tracks from an inner periphery of the optical disk to an outer periphery of the optical disk is commenced, using the optimum recording power determined in the preceding step. It is during this recording of test data that running OPC is performed in a step S20. In a step S22 the recording power is corrected according to the results of the running OPC. Then, in a step S24, the correction values developed as a result of the running OPC are matched against radial positions on the optical disk and stored as warp correction curves in the RAM 25a work area.

When in a step S26 the work of recording the test data to the outer periphery of the optical disk is completed, the above-described warp correction curves are matched with the appropriate optical disk type and registered in a warp correction curve table of the EEPROM within the ROM 25b in a step S28, thereby completing one full cycle of this process.

FIGS. 5A, 5B and 5C illustrate a warp correction curve, disk-at-once and multi-session recording, respectively.

With the process described above, a disk-at-once operation is performed like that illustrated in FIG. 5B, in which information is recorded in one continuous session from the inner periphery of the optical disk to the outer periphery of the optical disk without a break, and a warp correction curve indicated by a solid line I in FIG. 4A is registered in the ROM 25b. It should be noted that intrasurface sensitivity unevenness in the disk including optical disk warpage, though it may differ from one optical disk type to the next, is generally the same within each type of disk.

Figure 4:
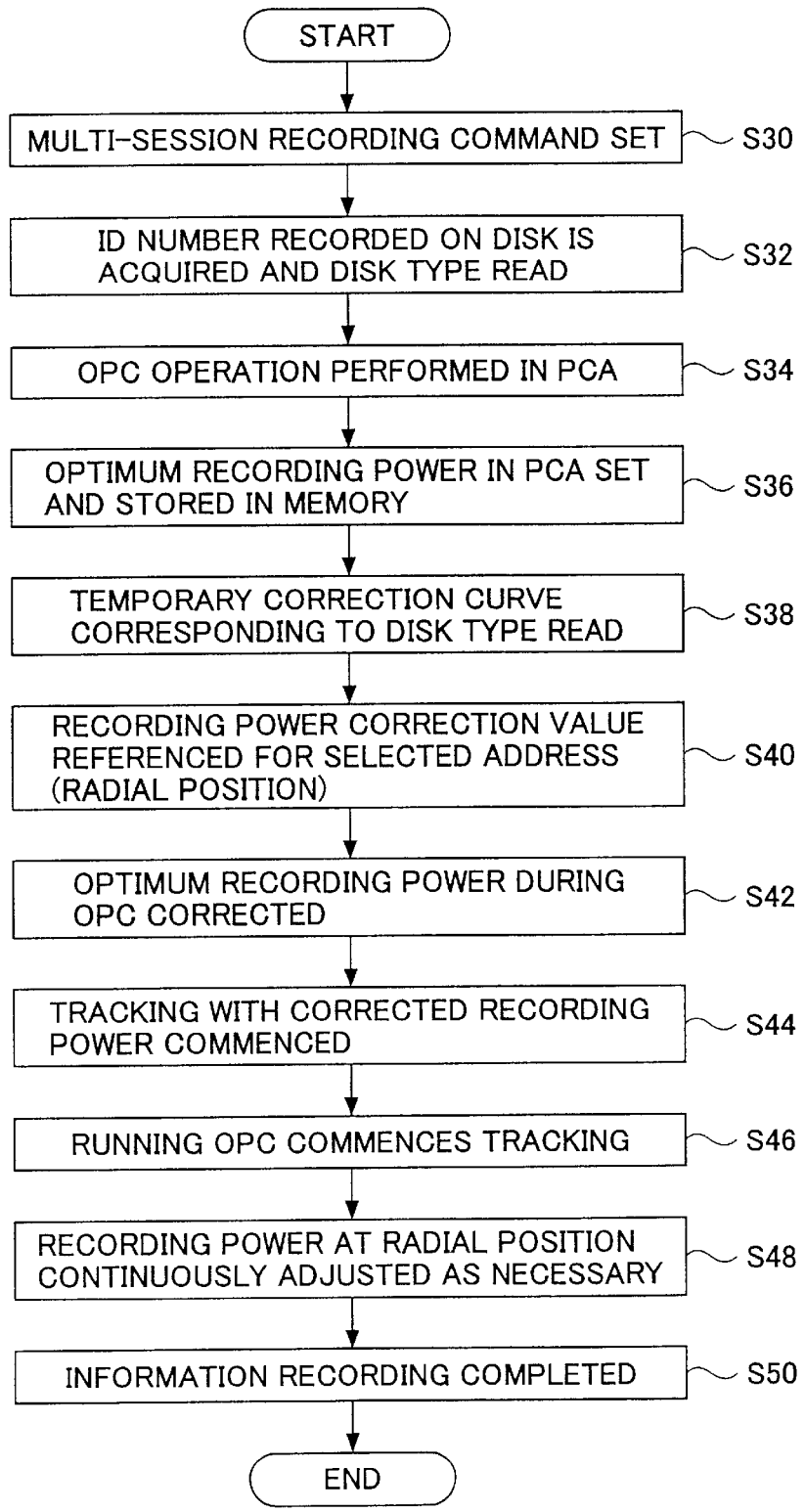
FIG. 4 is a flow chart of steps in a recording power determination process executed by an optical disk recording apparatus according to one embodiment of the present invention when multi-session recording is performed.

FIG. 4 is a flow chart of steps in a recording power determination process executed by an optical disk recording apparatus according to one embodiment of the present invention when multi-session recording is performed.

As shown in the diagram, in a step S30 a multi-session recording command is set in the optical disk recording apparatus, and in a step S32 an ID number recorded on the disk loaded into the optical disk recording apparatus is read and the optical disk type acquired. Next, in a step S34, an OPC operation is performed in a PCA that is the test recording area of the optical disk. In a step S36 the optimum recording power as per the OPC operation of the proceeding step is determined and stored in the work area of the RAM 25a.

Next, in a step S38, a warp correction curve that corresponds to the type of optical disk in use is read from a warp correction curve table using the disk type data acquired in step S38 as described above. Then, in a step S40, this warp correction curve is used to find a correction value for a radial position that corresponds to the address at which the apparatus is attempting to write information, and in a step S42 the recording laser power is corrected by the correction value so obtained. In a step S44, the writing of information on the optical disk commences, using the corrected recording obtained above. In a step S46 running OPC commences.

Thereafter, in a step S48 the recording of information onto the optical disk using recording laser power constantly corrected by running OPC proceeds. When in a step S50 the recording of information is completed, then one full cycle of the above-described process is completed. The referral to the table of correction values is at the beginning of the session only, with the running OPC taking over thereafter.

As a result of the above-described process, the writing of information at an arbitrary radial position on the disk during a multi-session recording process can proceed at optimum recording power throughout, unaffected by any warpage of the optical disk.

It should be noted that the process illustrated in FIG. 3 is effective at time of manufacture in the case of write-once optical disks. If, however, the disk is an erasable one, then by definition it can be rewritten, so such process may be carried out automatically when the operator first loads a disk with an unknown ID number into the recording apparatus. Additionally, even with a write-once disk, such process may be carried out so as to create the correction curve while writing data to the disk the first time such disk is loaded into the recording apparatus.

Further, though specifications locate the PCA which is a test recording area at the innermost periphery of the optical disk, no such convention governs the plurality of differing positions along the radial direction of the optical disk. In that case OPC may be carried out when the optical disk recording apparatus is produced, with the difference between the optimum recording power at any of a plurality of differing radial positions and the optimum recording power during PCA being registered as correction values in the warp correction curve table for that type of disk.

For clarity of understanding, it should be noted that the warp correction curve table stored in the ROM 25b corresponds to the table included in the claims, and that the steps S38 through S42 inclusive correspond to the correction component included in the claims.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 2000-219594, filed on Jul. 19, 2000, the entire contents of which are hereby incorporated by reference.

What is claimed is:

1. An optical disk recording apparatus for recording information onto a write-once or erasable optical disk, the apparatus comprising:

a memory component including a table of prerecorded correction curves for each type of a variety of different optical disks with each of said correction curves consisting of recording power correction values corresponding to radial positions on each optical disk determined from the results of a prior running optimum power control (OPC) operation matched against the radial positions on each optical disk and stored in the memory component;

a correction component for reading the correction value from the correction curves in the table corresponding to the radial position of the disk matching the address location on the optical disk at which the optical disk recording apparatus attempts to commence writing information and correcting the recording power in an optimum power control (OPC) operation at the matched address location using the correction value read from the correction curve; and a recording component for recording information onto the optical disk starting at the matched address location using the corrected recording power.

2. An optical disk recording apparatus for recording the information onto a write-once or erasable optical disk, the apparatus comprising:

a memory component including a table of prerecorded correction curves for each type of a variety of different optical disks with each of said correction curves consisting of recording power correction values corresponding to radial positions on each optical disk determined from the results of a prior running optimum power control (OPC) operation matched against the radial positions on each optical disk and stored in the memory component;

means for reading the correction value from the correction curves in the table corresponding to the radial position of the disk;

means for matching the address location on the optical disk at which the optical disk recording apparatus attempts to commence writing information; and means for correcting the recording power in an optimum power control (OPC) operation at the matched address location using the correction value read from the correction curve; and means for recording information onto the optical disk starting at the matched address location using the corrected recording power.

* * * * *